March 19, 1929.  G. L. HINMAN  1,706,160
STRAINER
Filed June 8, 1928
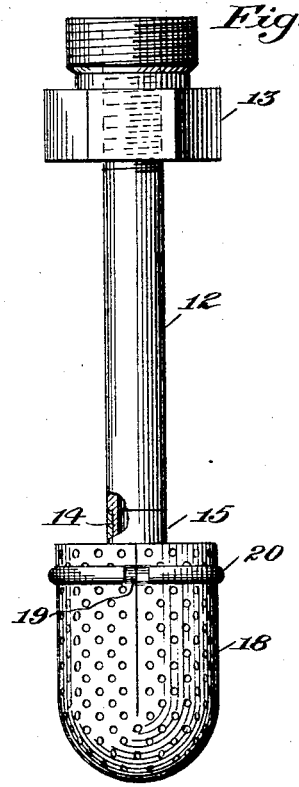
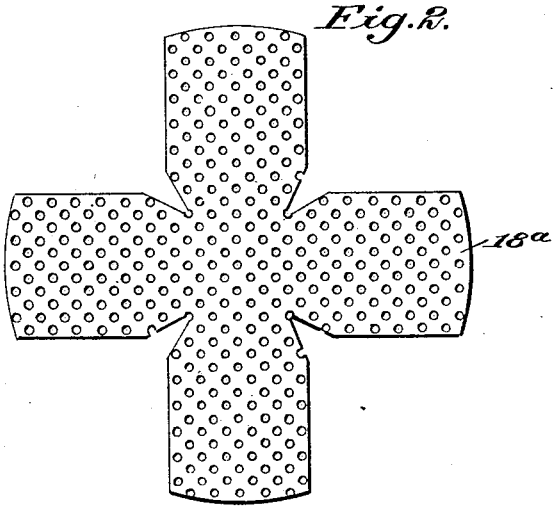
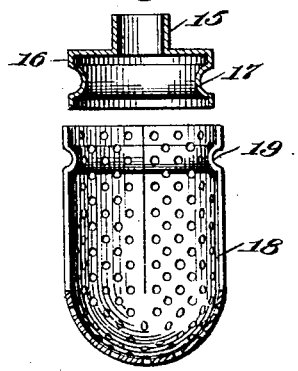
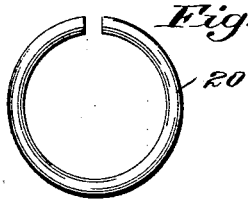

Patented Mar. 19, 1929.

1,706,160

UNITED STATES PATENT OFFICE.

GEORGE L. HINMAN, OF NEW HAVEN, CONNECTICUT, ASSIGNOR TO THE GREIST MANUFACTURING COMPANY, A CORPORATION OF CONNECTICUT.

STRAINER.

Application filed June 8, 1928. Serial No. 283,862.

This invention relates to strainers of that class shown and described in my application No. 226,627, filed October 17, 1927, the present invention being an improvement on the strainer of my said application. In forming the foraminous inverted thimble-like body of the strainer of my said application, by spinning it into shape from a blank consisting of a perforated or foraminous flat piece of metal, there is a tendency to close up the fine holes in the perforated blank, and this difficulty is avoided in the present invention by which the inverted thimble-like foraminous strainer is made from a blank having cut out portions leaving arms which may be bent into shape to form the thimble-like strainer, all as will hereinafter more fully appear.

In the drawing Fig. 1 is a sectional elevation of a strainer constructed in accordance with the present invention. Fig. 2 is a plan view of the perforated blank from which the body of the strainer is formed. Fig. 3 is a sectional detail view showing the strainer parts separated from each other, and Fig. 4 is a detail view of the clamping ring by which the body of the strainer is removably attached to the flange of the strainer head.

Referring to the drawing, 12 denotes a tube which is threaded at its upper end for the reception of a nut 13 which in turn is threaded for attachment to a pump or other part in connection with which the strainer is to be used. The tube 12 is constructed with an annular recess 14 which receives a sleeve-like part 15 of the strainer head 16 which is provided with an annular groove 17.

The foraminous strainer body 18 is formed from a perforated blank 18ª, shown in detail in Fig. 2, said blank being cut away to form four wings or parts which may be readily bent into shape to form the inverted thimble like strainer body 18. The body 18 is provided with an annular indentation 19 which, in mounting the strainer in place, is to be fitted into the annular groove 17 of the strainer head, and when thus fitted in place said strainer body will be attached to the strainer head by a split clamping ring 20 fitting in the groove 17 of the strainer head.

In mounting the strainer in place the sleeve part 15 of the strainer head 16 is forced into the annular groove 14 of the tube 12 by spinning or other process well known to those skilled in metal working, and the strainer body 18, bent into the shape shown in Figs. 1 and 3, is then fitted to said strainer head with the annular indentation 19 in register with the annular groove 17 in the strainer head. With the parts thus fitted together the split ring 20 is then slipped over the strainer body into place as shown in Fig. 1, said ring thus securely, but removably, fastening the strainer body to the strainer head. If it be desired to remove the strainer body from the strainer head, for cleaning or any other purpose, this can be done by opening the split ring slightly so as to remove the same, and the strainer body may then be slipped off from the strainer head, as will be understood.

Having thus described my invention I claim and desire to secure by Letters Patent:

The combination with a pump tube, of a strainer fixed thereto and comprising a strainer head having an annular groove, a split strainer body bent into inverted thimble-like shape and provide with an annular indentation fitting in said groove in said strainer head, and a split spring ring securing said strainer body to said strainer head.

In testimony whereof I affix my signature.

GEORGE L. HINMAN.